Nov. 5, 1968    J. B. O'MARA    3,409,733
CABLE SPLICE AND METHOD
Filed Oct. 7, 1966
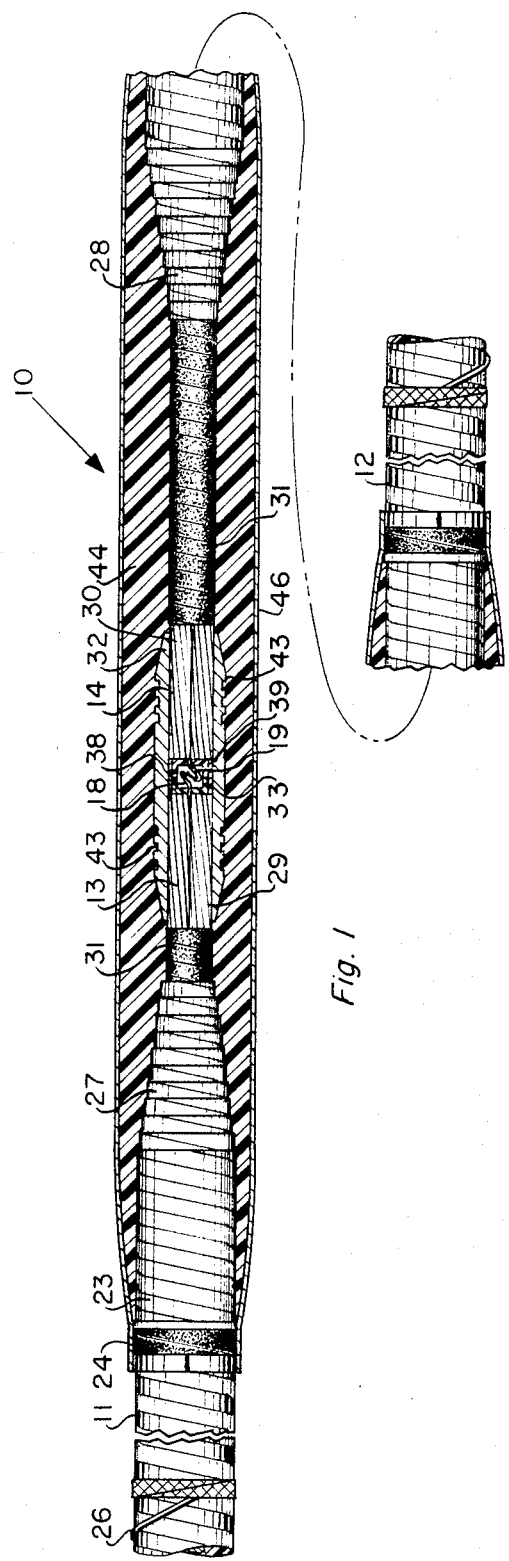
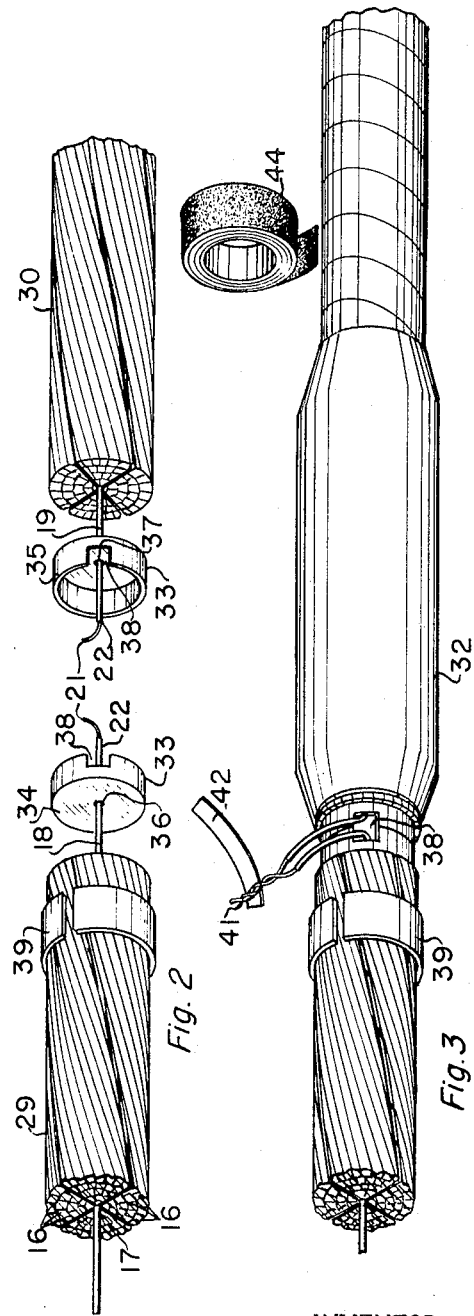
INVENTOR.
JOSEPH B. O'MARA
BY
V F Volk
HIS AGENT United States Patent Office 3,409,733
Patented Nov. 5, 1968

3,409,733
CABLE SPLICE AND METHOD
Joseph B. O'Mara, Hastings On Hudson, N.Y., assignor to Anaconda Wire and Cable Company, a corporation of Delaware
Filed Oct. 7, 1966, Ser. No. 585,152
7 Claims. (Cl. 174—88)

My invention relates to the splicing of electrical cables, and particularly to splicing cables having an insulated wire within the conductor strands.

Heavy electrical cables designed for transferring large blocks of power are operated at high temperatures whose limit is determined by the thermal properties of the cable insulation. In order to protect this insulation it is necessary to know the temperature of the cable conductor and to reduce the current in the cable if it gets too hot. This temperature cannot be accurately measured from the impedance of the conductors themselves because factors other than pure resistance make up this impedance. It is possible, however, to construct a cable that includes an insulated recording wire in the strands of the conductor, and to determine the conductor temperature by measuring the D.C. resistance of this wire. Useful as this cable construction is, however, its general adoption has been retarded by the lack of a satisfactory cable splice. In such a splice it is required, of course, that the electrical separation of the recording wire from the conductor should remain intact. At the same time the electrical and mechanical strength of the connection between the conductors themselves cannot be sacrificed.

My splice between two high-voltage cables having insulated wires within the conductor strands, which accomplishes both these purposes, comprises a tubular dielectric spacer having an outer diameter no greater than the diameter of the conductors abutting the ends of both of the cables. This spacer has a radial aperture larger than the combined sectional areas of the wires, which is advantageously covered by dielectric means such, for a preferred example, as a split cylinder. Lengths of the recording wires are left projecting from the ends of the conductors with the insulation stripped back a short distance from the ends of the recording wires, and there is an electrical connection between the wires within the spacer. The spacer and the ends of the conductors are surrounded by a compression sleeve which is securely compressed onto the conductors and free from compression against the spacer.

My splice will preferably have dielectric disks with center holes, covering the ends of the conductors, with the wires passing into the spacer through these holes. The spacer and disks together may be comprised of two cup-shaped sections.

My method of splicing electric cables comprising stranded metallic conductors and insulated wires within the conductor strands comprises the steps of cutting the conductors while exposing uncut lengths of the insulated wires, and of stripping a short length of insulation from the ends of these wires. I slide a compression sleeve over one of the conductors, line up the cables with a tubular dielectric spacer having a radial aperture therein between the ends of the conductors and then insert the wires into the spacer and radially project their ends outwardly through the aperture. I electrically connect the radially projecting ends and insert them back through the aperture into the spacer, then slide the compression sleeve back over the spacer and the other conductor. This is followed by compressing the sleeve over each conductor while leaving it free from compression over the spacer.

In a preferred embodiment, my method includes the additional steps of sliding a split dielectric cylinder over one of the conductors prior to inserting the wires into the spacer and sliding this cylinder over the spacer to cover the aperture after the connected ends are inserted back.

A more thorough understanding of my invention may be gained from the appended drawing.

In the drawing:
FIGURE 1 is a lengthwise view partly in section of a splice made in accordance with my invention.
FIGURES 2 and 3 show steps in the method of my invention.

My splice indicated generally by the numeral 10 of FIGURE 1 comprises a cable 11 which in the illustrated case is known as a pipe-type cable, and an identical cable 12. Although the cables 11, 12 are identical, having the same conductor diameters as well as their other dimensions, my invention can be used for connections between dissimilar cables also, when such connections are required. The cables 11, 12 comprise respective conductors 13, 14 made up of individual strands 16—16 (FIGURE 2) of copper or aluminum formed into sectors 17 and having the respective insulated recording wires 18, 19 running through the centers of the stranded conductors. The insulated wires 18, 19 are themselves comprised of a metal wire 21 and a wall of surrounding insulation 22. The cables 11, 12 each has a wall of taped installation such as paper insulation 23 built-up over its conductor, a conducting shielding layer 24 over the insulation 23; and since I am showing pipe-type cables, a skid-wire 26 over the shielding layer.

The insulation 23 is tapered down in the usual manner at the sections 27, 28 of the cables 11, 12 exposing lengths 29, 30 of conductor a portion of which may still retain its conducting strand shielding 31. It will be noted that the length of uninsulated conductor 30 of the cable 12 is longer than the length 29 of the cable 11. The reason for this is that provision must be made to slide on a compression sleeve 32, as will be explained. The ends of the conductors 13, 14 are free from conductor shielding and from any insulation on the outside of the conductor segments 17. A tubular spacer 33 having a diameter somewhat less than the diameter of the conductors 13, 14 is comprised of two cups 34, 35 (FIGURE 2) with end holes 36, 37 and a radial aperture 38. The ends of the wires 18, 19 are left long and protrude from the ends 29, 30 of the conductors, through the holes 36, 37 into the spacer 33. This spacer is made of a sturdy, high strength plastic material, such as nylon or polycarbonate, which is also unaffected by cable oils. Over the spacer 33 there is a split cylinder 39, preferably of the same dielectric material, which serves to cover the aperture 38. The ends 21 of the two wires 18, 19 have been twisted together to form an electrical connection 41 soldered (FIGURE 3) and covered with an optional adhesive insulating tape 42. The sleeve 32 has been compressed at the indents 43—43 over the conductor ends 29, 30 to grip the conductors firmly but no compression has been applied to the sleeve 32 over the spacer 33. The split cylinder 39 has an outer diameter about equal to the diameter of the conductors 29, 30 and it is now apparent that the reason the spacer 33 was made somewhat smaller, was to allow for this cylinder. Where it is not necessary to cover the aperture 38, as, for example, where the connection 41 is adequately insulated by an insulating sleeve or by the tape 42, and the outer cylinder is omitted, the spacer can have the same diameter as the conductors but should, in no case, be larger. The conducting surface of my splice is smoothed out by wrapping semiconducting tape over the sleeve and over any exposed conductor, from the strand shieldings 31 on the ends 29 and 30. Insulation such as impregnated crepe paper 44 is wrapped over the tapered length 27, sleeve 43, and tapered length 28 to a diameter tapering to one in excess of the original cable insulation, and an overall shielding such as a tinned copper tape 46 is wrapped over the insulation 44 making electrical contact with the outer shielding 24 on both cables.

To make the splice of my invention, the ends of the cables, including the conductors 13 and 14 are first cut square being careful not to cut the insulated wires 18, 19 or the insulation 22 of these wires, and to expose a sufficient length of the recording wires for making a connection. About 2½ inches are needed. The insulation is then removed to form the tapered lengths 27, 28, the sleeve 32 is slid over the end 31 and the split cylinder 39 sprung open and slid over the end 29. The cables are lined up. The wire 18 is inserted through the hole 36 and the wire 19 is inserted through the hole 37, each wire being bent upwardly through its half of the aperture 38. The cables are then brought together to close the halves of the spacer as shown in FIGURE 3. The ends 21 are twisted together and soldered to form the connection 41. If desired, the twisted ends can be wrapped with the insulating tape 42 or inserted in an insulating sleeve or cap. Thereafter the connection 41 is pushed back through the aperture 38 and the split cylinder 39 is slid over the spacer and permitted to snap closed. The cylinder 39 is then turned 180° so that the split is not aligned with the aperture 38. The sleeve 32 is slid back over the cylinder 39 until it covers the bared conductor on the end 29, this bared end having been accurately measured when the strand shielding 31 was removed. The sleeve is compressed onto the ends 29 and 30 with a hydraulic compression tool of known type forming the indents 43. Strand shielding tape is applied over the spacer 32, the insulating tapes 44 are wrapped over the connection and are covered by wrapping with copper mesh shielding tape. Completion of the splice from thence forward is conducted by well known methods for pipe-type cables. It will be understood, of course, that although I have illustrated a splice and method for pipe-type cables, my invention is useful for any other cables having an insulated pilot or recording wire within the conductor strands.

I have invented a new and useful article and method for which I desire an award of Letters Patent.

I claim:
1. A cable splice between two high-voltage cables comprising metal conductors having insulated temperature recording wires within the conductor strands, comprising:
   (A) a tubular dielectric spacer
      (a) abutting the ends of the conductors of both of said cables,
      (b) said spacer having an outer diameter no greater than the diameter of said conductors,
      (c) said spacer having a radial aperture larger than the combined sectional areas of said recording wires,
   (B) lengths of said recording wire projecting from said conductors, the insulation of each of said wires being stripped back a short distance at the ends thereof,
   (C) an electrical connection between said wires within said spacer, and
   (D) a compression sleeve surrounding said spacer and said conductors
      (a) said sleeve being securely compressed onto each of said conductors and free from compression against said spacer.

2. The splice of claim 1 comprising dielectric disks covering the ends of said conductors, said disks having center holes and said wires passing through said holes into said spacer.

3. The splice of claim 1 wherein said spacer and said disks are comprised of two cup-shaped sections.

4. The splice of claim 1 comprising dielectric means covering said aperture.

5. The splice of claim 4 wherein said dielectric means comprises a split cylinder.

6. The method of splicing electric cables comprising stranded metallic conductors and insulated wires within the conductor strands comprising the steps of:
   (A) cutting said conductors while exposing uncut lengths of said insulated wires,
   (B) stripping a short length of insulation from the ends of said wires,
   (C) sliding a compression sleeve over one of said conductors,
   (D) lining up said cables with a tubular dielectric spacer having a radial aperture therein, between the ends of said conductors,
   (E) inserting said wires into said spacer and radially projecting the ends of said wires outwardly through said aperture,
   (F) electrically connecting said radially projecting ends,
   (G) inserting said connected ends back through said aperture into said spacer,
   (H) sliding said compression sleeve back over said spacer and the other of said conductors, and
   (I) compressing said sleeve over each of said conductors while leaving it free from compresison over said sleeve.

7. The method of claim 5 comprising the additional steps of sliding a split dielectric cylinder over one of said conductors prior to the step of inserting the wires into the spacer and sliding said cylinder over said spacer and covering said aperture therewith after inserting said connected ends back through said aperture.

References Cited

UNITED STATES PATENTS

| | | | |
|---|---|---|---|
| 1,973,068 | 9/1934 | Held | 174—11 |
| 3,163,703 | 12/1964 | McLoad | 174—11 |
| 3,187,080 | 6/1965 | Ball | 174—11 |

DARRELL L. CLAY, *Primary Examiner.*